US007146332B2

(12) United States Patent
Owen, Jr.

(10) Patent No.: US 7,146,332 B2
(45) Date of Patent: Dec. 5, 2006

(54) METHODS AND SYSTEMS FOR AUTOMATIC TRACKING AND BALANCING BILLING DATA

(75) Inventor: Eugene Owen, Jr., Alabaster, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1099 days.

(21) Appl. No.: 09/728,705

(22) Filed: Dec. 1, 2000

(65) Prior Publication Data

US 2004/0073500 A1 Apr. 15, 2004

(51) Int. Cl.
*G07B 17/00* (2006.01)

(52) U.S. Cl. ........................................ 705/30

(58) Field of Classification Search .................. 705/40, 705/30, 34
See application file for complete search history.

(56) References Cited

U.S. PATENT DOCUMENTS

| | | | | |
|---|---|---|---|---|
| 5,483,445 | A * | 1/1996 | Pickering | 705/40 |
| 5,608,874 | A * | 3/1997 | Ogawa et al. | 709/246 |
| 5,943,656 | A | 8/1999 | Crooks et al. | |
| 5,963,925 | A * | 10/1999 | Kolling et al. | 705/40 |
| 6,006,205 | A * | 12/1999 | Loeb et al. | 705/34 |
| 6,049,786 | A * | 4/2000 | Smorodinsky | 705/34 |
| 6,070,150 | A * | 5/2000 | Remington et al. | 705/40 |
| 6,078,907 | A * | 6/2000 | Lamm | 705/40 |
| 6,128,602 | A * | 10/2000 | Northington et al. | 705/35 |
| 6,173,272 | B1 * | 1/2001 | Thomas et al. | 705/42 |

(Continued)

FOREIGN PATENT DOCUMENTS

WO WO 0163530 * 8/2001

OTHER PUBLICATIONS

Webster's II New Riverside University Dictionary, 1988, p. 148.*

(Continued)

*Primary Examiner*—Lynda Jasmin
(74) *Attorney, Agent, or Firm*—Cantor Colburn LLP

(57) ABSTRACT

The present invention is a method and system of automatically tracking and balancing account receivable data transmitted to a processing entity by a service provider. A service provider submits to a processing entity a billing data file. The billing data file includes the service provider's customer account records which represent the service provider's accounts receivable. The processing entity tracks the accounts receivable data transmitted by the service provider and processed by the processing entity by separating individual customer account records into tracking data sets based on pre-defined criteria. To ensure that the processing entity has properly tracked all the accounts receivable submitted to and processed by the processing entity, the processing entity computes the total amount of accounts receivable located in each tracking data set related to a given service provider. The invention further comprises comparing the total amount of pre-processed accounts receivable related to a given service provider, to the total amount of processed accounts receivable related to the service provider. When the comparison reveals a discrepancy between total pre-processed and processed accounts receivable, the processing entity creates a discrepancy report. The discrepancy report is routed to the processing entity's personnel alerting them that an error has occurred. If there is not discrepancy, a settlement report is created which list the total about of accounts receivable located in the tracking data sets of the processing entity.

23 Claims, 5 Drawing Sheets

U.S. PATENT DOCUMENTS

| | | | |
|---|---|---|---|
| 6,304,857 B1 * | 10/2001 | Heindel et al. | 705/34 |
| 6,408,284 B1 * | 6/2002 | Hilt et al. | 705/40 |
| 2001/0034704 A1 * | 10/2001 | Farhat et al. | 705/39 |
| 2002/0007327 A1 * | 1/2002 | Steury et al. | 705/34 |
| 2002/0026394 A1 * | 2/2002 | Savage et al. | 705/34 |
| 2002/0103808 A1 * | 8/2002 | Owen, Jr. | 707/102 |

OTHER PUBLICATIONS

Kasavana et al, "Full Service" Restaurant Business, Aug. 1988, v87, n12, p. 173(11) (Dialog # 03686606, file 148).*

Business Wire "Source Services Corp. Opens New Accountant Source Temps Office in Salt Lake City" Sep. 1997 (Dia #09721290, file 148).*

\* cited by examiner

{100

| CARRIER ID | CUSTOMER ACCT NUMBER | AMOUNT PAYABLE | BILLING CYCLE |
|---|---|---|---|
| 1112 | 123456789 | $112.00 | 1 |
| 1112 | 123456778 | $50.00 | 3 |
| 1112 | 123456788 | $250.00 | 2 |

FIGURE 5A

| CARRIER ID | CUSTOMER ACCT NUMBER | AMOUNT SERVICE PROVIDED | BILLING RATE | BILLING CYCLE |
|---|---|---|---|---|
| 1112 | 123456789 | 210 | .10 | 1 |
| 1112 | 123456788 | 1000 | .25 | 3 |
| 1112 | 123456787 | 1500 | .05 | 2 |

FIGURE 5B

METHODS AND SYSTEMS FOR AUTOMATIC TRACKING AND BALANCING BILLING DATA

FIELD OF THE INVENTION

The present invention relates to methods and systems for account billing Embodiments of the present invention provide automatic tracking and balancing of billing data routed from a service provider to a bill processing entity.

BACKGROUND

Our society is driven by service providers that provide an infinite number of services to thousands, if not millions, of customers throughout the United States and the world. These service providers are consistently striving to bring- their customers more choices through improved services. While the services provided by various entities may be as different as night and day, service providers all have one thing in common: the need to bill customers. Although developing new ideas to improve services may be exciting and enjoyable, the cumbersome task associated with billing customers can be time consuming and overwhelming. Perhaps even more daunting for large and small entities alike is the problem of liquidity associated with waiting for customers to pay for services rendered. When a service provider assumes the tasks of billing its customers, the service provider is only paid when individual customers decide to pay their account. Thus, the service provider has assets in the form of accounts receivable but not in available cash.

Bill processing entities have come to the rescue of many service providers that want to save time and increase liquidity. Generally, a bill processing entities can save service providers time by processing customer bills, mailing bills to customers, and receiving payment from customers. Bill processing entities can also increase service providers' liquidity by purchasing accounts receivable, thereby reducing the time that service providers have to wait before receiving cash assets for services rendered to customers.

Typically, when a service provider enlists the services of a bill processing entity, the service provider is paid for accounts receivable according to the billing cycle of each account. Generally, the service provider is only paid for accounts receivable payable in a given billing cycle, e.g. the current billing cycle. Accounts payable in a subsequent billing cycle are generally stored in the bill processing entity's system until the account's billing cycle is current. Therefore, the bill processing entity must have the ability to track customer accounts so that when an account's billing cycle comes current, the service provider is paid accordingly.

Bill processing entities have conventionally tracked customer accounts by separating customer accounts into categories based on the account's billing cycle status. For instance, there could be a category for accounts payable in the current billing cycle, a category for accounts payable in a future billing cycle and a catch-all category for any accounts that could not be placed in any other category.

Dividing customer accounts into different "tracking" categories makes it easier for processing entities to determine how much an individual service provider should be paid and when the payment should be made. On the other hand, dividing customer accounts into different categories makes it more difficult for the bill processing entity to detem~ine whether the bill processing entity has accurately processed all the service provider's accounts receivable.

Bill processing entities have a variety of methods to reconcile the accounts receivable submitted by service providers with the accounts receivables processed by the bill processing entity. Prior to this invention, one such method involved printing all the accounts receivable data for a given service provider from each tracking category. The bill processing entity would then manually reviewed each account receivable and calculated the total amount of processed account receivable using a simple hand-held calculator. After reviewing and adding thousands of account receivable entries, the bill processing entity compared the total amount of pre-processed accounts receivable submitted to the processing entity with the total amount of accounts receivable processed by the bill processing entity.

The best case scenario occurred when the total pine-processed accounts receivable equaled the total processed accounts receivable. In such cases, the bill processing entity could assure itself and the service provider that the bill processing entity had processed all accounts receivable submitted. However, it is not uncommon for the total pre-processed accounts receivable not to equal the total processed accounts receivable. Such inconsistencies threaten the reliability and efficiency of the bill processing entities' system.

Prior to this invention, when the total pre-processed accounts receivable did not equal the total processed accounts receivable for a given service provider, the manual calculations described above had to be repeated to determine if human error was the source of the discrepancy. If the discrepancy was not due to human error, but instead occurred in the way the data was received from the service provider or in the way the bill processing entity processed the data, finding the real source of the problem could be substantially delayed. Prior to this invention, the time lost in locating the source of errors often resulted in delays in payment to service providers, or overpayment to service providers. In many cases, delays in payment resulted in the bill processing entity paying late fees to service providers. In addition, when the processing entity underpays the service provider, the processing entity may have to pay a penalty fee.

Human error and delay are major concerns when manually performing the tedious, yet highly important function of balancing pre-processed accounts receivable with processed accounts receivable for a given service provider. Moreover, the man-power needed to manually perform the tasks of balancing pre-processed and processed accounts receivable is costly and inefficient to say the very least. Thus, there is a need to automate the task of tracking and balancing account receivable data submitted to bill processing entities.

SUMMARY OF INVENTION

The present invention provides an automated method for tracking and balancing accounts receivable data that overcomes the aforementioned disadvantages and provides numerous advantages.

In an embodiment of the present invention, service providers, (hereinafter "carriers") and processing entities (hereinafter "PEs") enter an agreement in which the carrier sells its accounts receivable to a PE and the PE agree to handle the administrative tasks associated with billing the carrier's customers. The PE pays the carrier according to the billing cycle status of accounts receivable and the PE receives payment directly from the carrier's customers. Although the embodiment of the invention contemplates that the carrier and the PE are separate entities, it is possible to adapt the methods and systems to accommodate different departments or groups of the same entity.

According to the present invention, carriers submit to a PE individual customer billing information grouped together in a billing data file. It is possible for the carrier to submit the billing data file in hard copy form, however, for efficiency it is preferable that the billing data file be submitted electronically. Billing data files may include individual customer account records. The customer account records may comprise information about each of the carrier's customers, including, but not limited to one or more of the following types of information: customer account number, the amount payable by the customer for services provided, and/or the billing cycle in which the account payment is due. Customer account records may further include additional information about the customer such as the customer's billing address, phone number etc.

Once the PE receives the carrier's billing data file, the customer account records are processed by the PE's system. One aspect of processing billing data files involves separating customer account records into appropriate tracking categories. The number and contents of tracking categories may depend on the information included in the customer account record and the agreement between the carrier and the PE as to how the carrier will be paid for accounts receivable.

In an embodiment of the invention, the carrier is paid based on the billing cycle status of each customer account. In this embodiment, customer account records may be separated into tracking categories based on the billing cycle in which payment is due. For example, the tracking categories may include, 1) billed, if the customer account record indicates a an account payable in the current billing cycle; 2) unbilled, if the customer account record indicates an account payable in a future billing cycle; and 3) error, if the customer account record was rendered invalid because it could not be separated into either of the other categories due to an error. Because in this embodiment of the invention carriers are only paid for customer accounts payable in the current billing cycle, tracking categories are useful in determining when and in what amount PEs should pay carriers for accounts receivable.

After the accounts receivable are processed and before the carrier can be compensated, the total pine-processed accounts receivable must balance with the total processed accounts receivable. In order to reconcile the total amount of pine-processed accounts receivable with the total amount processed accounts receivable, the PE computes the total amount of accounts receivable in each tracking category for a given carrier. The total amount of processed accounts receivable is subsequently compared to the amount of pine-processed accounts receivable submitted by the carrier.

If the carrier's pine-processed accounts receivable equals the PE's processed accounts receivable, the carrier may be paid and a settlement report is printed for the carrier. In one aspect of the invention, the settlement report shows the carrier the amount it will be paid for accounts receivable payable in the current billing cycle, the amount the carrier will be paid in the future, and the amount of accounts receivable that could not be processed due to an error. The goal of providing the carrier a settlement report is to assure the carrier that the PE has received and processed all the accounts receivable data submitted to the PE. It further provides the carrier with an idea of the amount of accounts receivable to be paid in the future. The settlement report also gives the PE an opportunity to correct any accounts receivable that resulted in an error in the PE's system.

If the carrier's pine-processed accounts receivable does not equal the PE's processed accounts receivable, a processing error has occurred and the carrier is flagged. If a carrier is flagged, a settlement report is not printed. Instead, flagged carriers are added to a discrepancy report. The PE reviews the discrepancy report and investigates to determine the source of each discrepancy.

One advantage of this invention is that it automatically locates data in the tracking categories based on a set of criteria and calculates the processed accounts receivable for each carrier in the PE's system. It also automatically compares the pine-processed and the processed accounts receivable. Automatically performing these tasks enables the PE to quickly reconcile processed accounts receivable with pine-processed accounts receivable and distribute settlement reports to carriers.

It is a further advantage of the invention that it automatically computes and compares pine-processed and processed accounts receivable, thereby reducing the human error associated with manually adding thousands of numbers. Moreover, by reducing human error, carriers are not only paid more promptly but the carrier is also not overpaid or underpaid because of an error in calculating processed accounts receivable.

Yet another advantage of the invention is that processing errors are located much more quickly. Because the PE is not manually balancing pine-processed accounts receivable with processed accounts receivable, the PE has more time to concentrate on determining the cause of errors. It is advantageous to have this additional time so that the PE may be proactive in solving repetitive errors instead of merely waiting for errors to occur. Further details and advantages of the present invention are set forth below.

BRIEF DESCRIPTION OF THE FIGURES

FIG. 5a is a diagram illustrating an example of the contents of a billing data file.

FIG. 5b is a diagram illustrating an example of the contents of customer account records.

DETAILED DESCRIPTION

Figure 1:
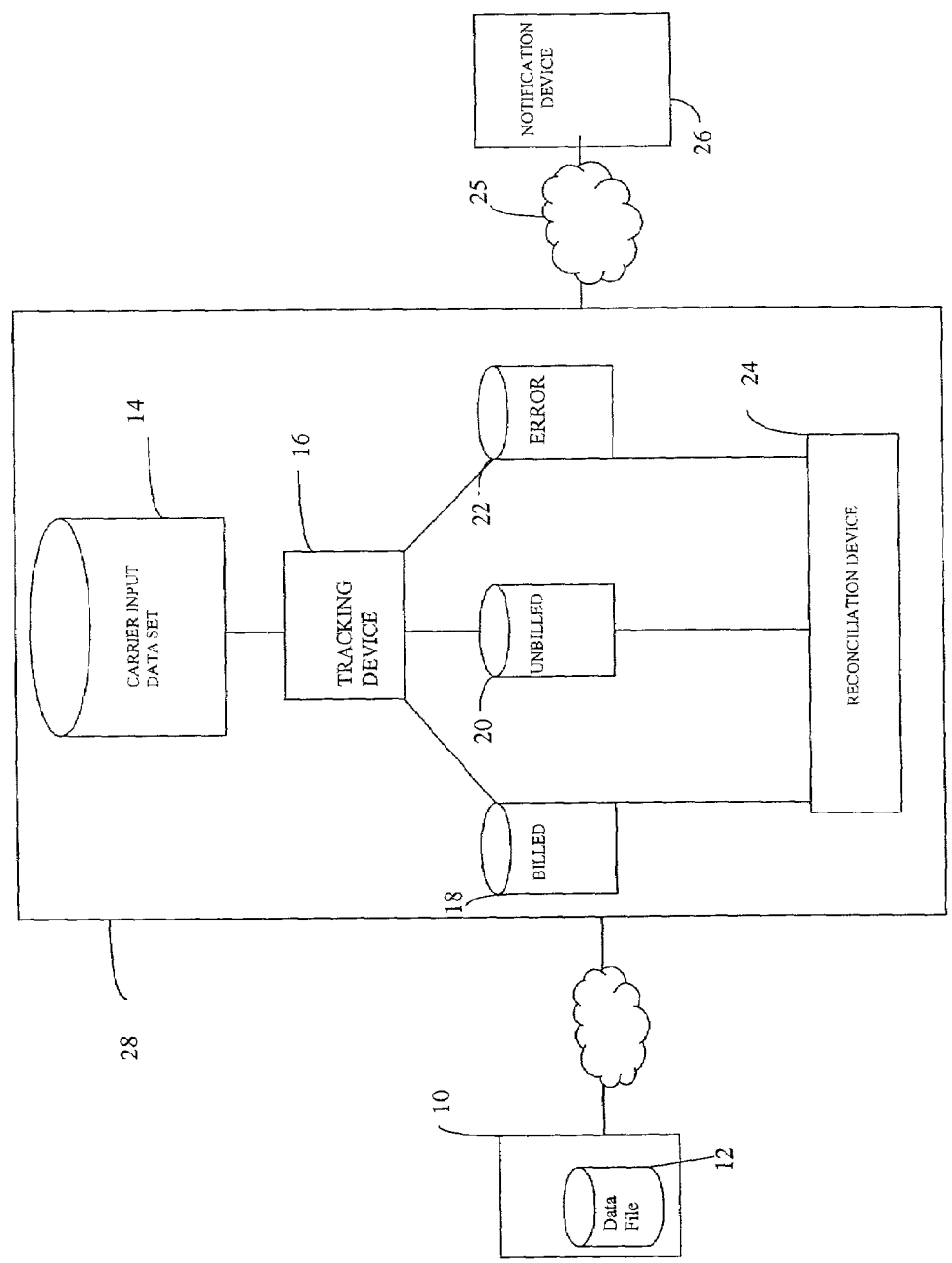
FIG. 1 is a block diagram that shows the connectivity of an embodiment of the present invention.

The present invention is directed to methods and systems for tracking and balancing accounts receivable data. The particular embodiments described herein are intended in all respects to be illustrative rather than restrictive. Alternative embodiments will become apparent to those skilled in the art to which the present invention pertains without departing from the spirit and scope.

Overview of the Present Invention

The present invention provides for a method and system of automatically tracking and balancing account receivable data comprising: submitting a billing data file to a processing entity with the billing data file comprising customer account records representing accounts receivable for a given carrier; separating customer account records into at least two tracking data sets based on pre-defined criteria; computing the total amount of accounts receivable located in each tracking data set related to a given carrier; comparing the total amount of pine-processed accounts receivable related to a given carrier, to the total amount of processed accounts receivable related to said carrier; creating a discrepancy report comprising carriers whose total amount of preprocessed accounts receivable do not equal the total amount of processed accounts receivables; and creating a settlement report for each carrier whose total amount of pine-processed accounts receivable submitted equals the total amount of processed accounts receivable.

According to an embodiment of the present invention, the billing data file mentioned above, comprises a unique means to identify each carrier and a plurality of customer records. In the preferred embodiment, this unique identifying means is a carrier identification number. The customer records in the preferred embodiment comprise information such as, a customer account number, the amount payable for services rendered by the carrier and the customer's billing cycle. In a preferred embodiment of the present invention, the customer's billing cycle is used to separate the customer records into tracking data sets.

In the preferred embodiment of the present invention, the tracking data sets include, a data sets labeled billed, an unbilled, and error. The billed data set comprises customer records with accounts payable in the current billing cycle. The unbilled data set comprises customer records with accounts payable in a future billing cycle. The error data set comprises invalid customer records. These tracking data sets are useful in determining when and in what amount, a given carrier should be paid for accounts receivable.

In the preferred embodiment of the present invention addition, the discrepancy report comprises the total amount of pine-processed accounts receivable relating to a given carrier and the total amount of processed accounts receivable located in each tracking category relating to the carrier. In addition, the settlement report comprises the amount of accounts receivable data located in each tracking category relating to a given carrier.

In an embodiment of the present invention the discrepancy report and the settlement report are routed to at least one location accessible to a end-user of each respective report. In a preferred embodiment of the present invention, the discrepancy report is routed to at least one location accessible to at least one discrepancy source-identifier.

In yet another embodiment of the present invention, the discrepancy report and the settlement reports are routed to a workstation connected to the PE's system by a local network.

Another embodiment of the present invention includes, in addition to the elements described above, establishing an agreement between a plurality of carriers and a PE, with the carrier agreeing to submit billing data files to the PE and the PE agreeing to process the billing data files and remit payment of the carrier.

Further details of the steps of the present invention are described below with reference to the appended figures.

Overview of an Embodiment of the Present Invention

FIG. 1 is a block diagram that shows the connectivity of an embodiment of the present invention. In an embodiment of the present invention, at least two entities are involved: a PE and a carrier or an entity acting on behalf of a carrier. Carriers 10 can be any organization or institution with a desire to sell its accounts receivable and receive assurance that they are being properly and timely paid. Utility companies, telecommunications companies, communication service providers, retail institutions, credit organizations and other similarly situated organizations fit within the broad and limitless profile of organizations that can leverage from the systems and methods contemplated by this invention. Likewise, the PE is a diverse group of organizations comprising any entity that is capable of maintaining and implementing the systems and methods of this invention. As will be appreciated by one skilled in the relevant art, carriers and PEs are not required to be separate distinct entities. The present invention could obviously be adapted to apply to carriers and PEs which are members of the same entity that has a need and desire to accurately account for account receivable data. In such cases, the advantage to the carrier of liquidity when the PE is a separate entity may be diminished.

In the embodiment shown in FIG. 1, the carrier 10 electronically routes a data file 12 containing accounts receivable to the PE's system. The carrier's data file 12 may be electronically routed in any number of ways which will be appreciated by one skilled in the relevant art. In an embodiment of the present invention, the data file is routed from the carrier's network to the PE's system using a File Transfer Protocol (FTP).

The PE's system 28 provides a reliable means of tracking and reconciling accounts receivable data contained in data files 12 routed to the PE by carriers 10 or on carriers' behalf. The PE's system 28 may take any form of a network of desired platforms, computers or other functionality capable of storing and retrieving multiple data sets and applications. En the preferred embodiment, the PE's system 28 is a mainframe.

The PE's system 28 comprises a number of data sets and devices used to store, track, and reconcile account receivable data submitted by carriers 10 or on behalf of a carrier. The data sets stored on the PE's system 28 include, but are not limited, a carrier input data set 14 and a plurality of tracking data sets. The carrier input data set 14 stores data files 12 submitted by carriers 10 or submitted on behalf of carriers. The PE's system further contains tracking data sets. The tracking data sets are used to store processed accounts receivable data. In an embodiment of the invention, the tracking data sets include, but are not limited to, the billed data set 18, the unbilled data set 20 and the error data set 22. The billed data set 18 comprises accounts receivable payable in the current billing cycle. The unbilled data set 20 comprises accounts receivable payable in a future billing cycle. The error data set 22 is a catch-all data set for all accounts receivable that can not be stored in any other data set. In an embodiment of the present invention, the error data set 22 comprises accounts receivable that 1) could not be processed because of invalid customer account information or 2) did not met the criteria to be placed in either the billed 18 or unbilled 20 tracking data sets. While this embodiment contains the billed 18, unbilled 20 and error 22 tracking data sets, any number of tracking data sets may be used to carry out the methods of this invention. The number of tracking data sets and the contents stored therein will depend on the tracking parameters defined by the PE.

FIG. 1 further shows a tracking device 16 and a reconciliation device 24. The tracking device 16 is used to extract accounts receivable, data based on pre-defined criteria, from the data files stored in the carrier input data set 14. The tracking device 16 thereafter places the extracted accounts receivable data in the appropriate tracking data set. The method the tracking device 16 uses to locate and place extracted accounts receivable data into the appropriate tracking data set is further described below.

The reconciliation device 24 shown in FIG. 1 is used to balance the total pre-processed accounts receivable with the total processed accounts receivable. The reconciliation device 24 is capable of locating and copying accounts receivable data from each tracking data set based on pre-defined criteria. The reconciliation device 24 is further capable of computing the total amount of accounts receivable processed by automatically adding the accounts receivable data copied from the tracking data sets for a given carrier. The reconciliation device 24 is also capable of comparing the total pre-processed accounts receivable with the total processed accounts receivable for each carrier. In yet another embodiment of the invention, the reconciliation device 24 creates a report containing carriers whose pre-processed accounts receivable does not equal the processed accounts receivable. In addition, the reconciliation device 24 creates a settlement report containing a carrier whose pre-processed accounts receivables equals the processed accounts receivable.

In an embodiment of the invention, the reconciliation device 24 is an enhanced version of a mainframe application commonly known as UNITECH. UNITECH is conventionally used as an accounting and reconciliation application. While the embodiment described herein uses an enhanced version of UNITECH, any device, application or a combination of devices and applications may be used as a reconciliation device 24 if it is capable of performing the tasks of the reconciliation device described.

FIG. 1 further shows that the PE's system is connected to an external notification device 26. The notification device can be any means of communicating information regarding a carrier's accounts receivable to the PE's system operator or similarly situated personnel. The notification device 26 in the preferred embodiment is a workstation accessible to the PE's system operator. In an embodiment of the invention, the notification device 26 delivers discrepancy and settlement reports to a PE system operator or other similarly situated PE personnel.

Method of Operation of an Embodiment

Figure 2:
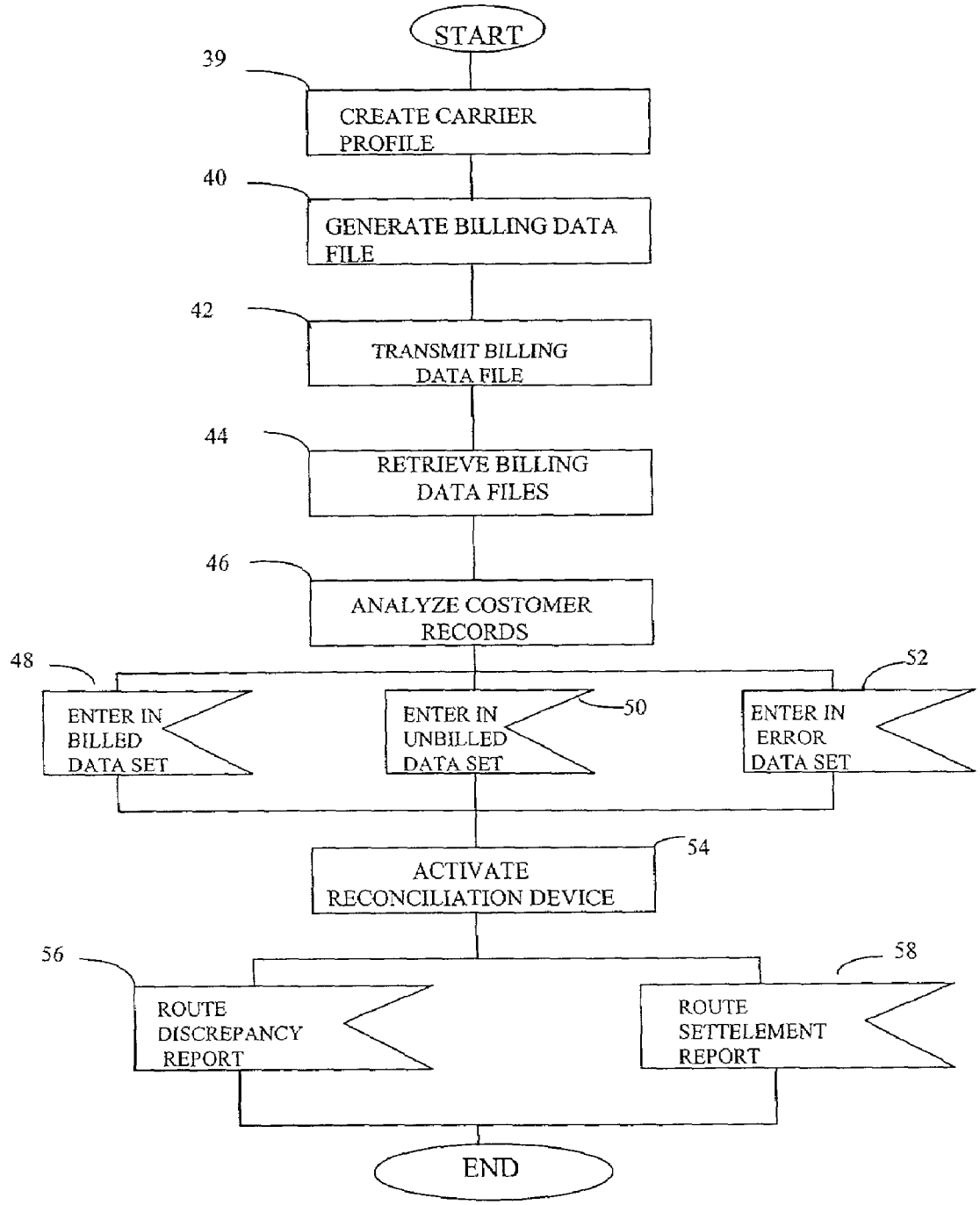
FIG. 2 is a flow diagram illustrating a method of operation of the present invention.

FIG. 2 is a flow diagram illustrating a method of operation of the present invention. Prior to the carrier transmitting billing data files to the PE, the PE creates a carrier profile 39. The carrier profile 39 includes information about each carrier. At least some portion of information in the profile is used by the reconciliation device to identify each carrier's account receivable data. For example, a carrier profile may include 1) the carrier's name, 2) address, 3) telephone number, and 4) a unique means to identify each carrier. In an embodiment of the invention, the unique means to identify the carrier comprises a unique, randomly generated numerical code assigned to each carrier by the PE. As will be appreciated later, the carrier's identification code is used by the reconciliation device 24 shown in FIG. 1 to locate account receivable data stored in tracking data sets.

In addition, before a data file is routed to a PE, the data file must be generated 40 by the carrier The format of the billing data file may be agreed upon in advance by the PE and the carrier. In one embodiment of the invention, the billing data file generated by the carrier 40 includes multiple customer account records, each record containing a carrier unique identification code.

FIG. 5a shows an example of the contents of a billing data file. The billing data file comprises multiple customer accounts records 100. As shown in FIG. 5a, customer account records 100 may comprise a carrier identification code 110, a customer account number 112 the amount payable for services rendered 114 and the billing cycle 116a in which each customer's account is payable. The amount payable by a customer for services rendered 114 is used to compute the total amount of account receivable transmitted by a given carrier and processed by the PE.

FIG. 5b shows an example of the contents of customer account records in another embodiment of the present invention. In FIG. 5h, the customer account records comprise the carrier identification code 110b, a customer's account number 112b, the quantity of service provided to the customer 118, the billing rate for services provided to the customer 120, and the billing cycle in which the customer's account is payable 116b. The quantity of service provided to the customer 118 multiplied by the billing rate for the service provided to the customer 120 is used to compute the total amount of accounts receivable transmitted by the carrier and processed by the PE.

Returning to FIG. 2, after the carrier has generated the billing data file 40, it routes the data file to the PE 42. At a preset time, the tracking device 16 shown in FIG. 1 retrieves a data file 44 from the carrier input data set 14. After the tracking device retrieves the data file 44, it analyzes each customer account record contained in the data file 46. Based on the analysis of each customer account record the tracking device enters each customer account record into the appropriate tracking data sets; i.e. billed 48, unbilled 50, or error 52.

Figure 3:
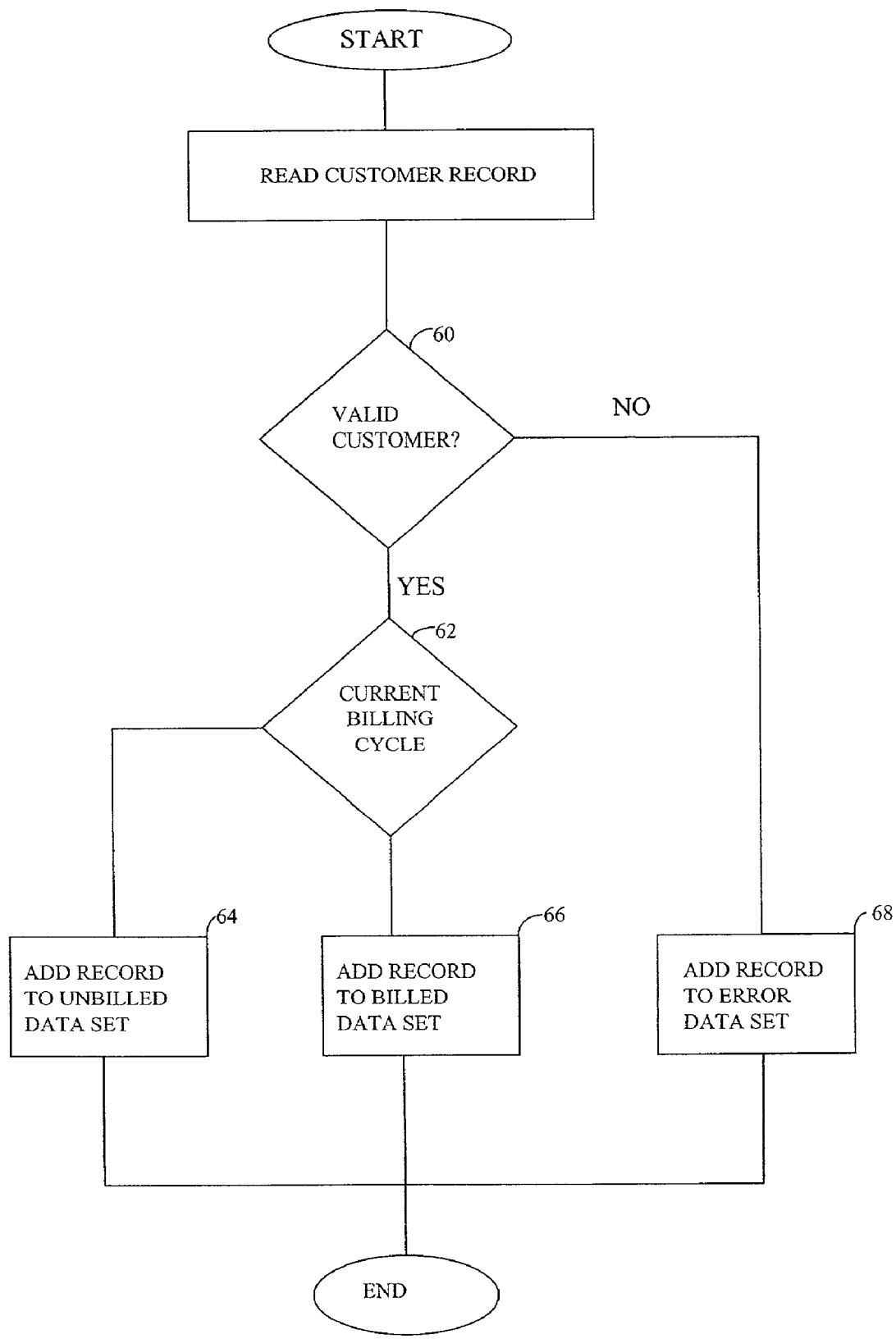
FIG. 3 is a flow diagram illustrating a method of operation for tracking accounts receivable.

FIG. 3 is an example of a method of operation of the tracking device when analyzing customer accounts records contained in data flies. First, the tracking device determines whether the customer account record is valid 60 based on a set of pre-defined criteria. In one embodiment of the present invention, the tracking device determines whether a customer is valid by comparing the account number provided in the customer account record with a list of valid account numbers provided to the PE by the carrier. The tracking device may also determine whether a customer is valid based on the PE's past relationship with customers identified in the customer account record. For example, if the customer has previously defaulted on payment to the PE, the PE may transfer that customer's account to a collection agency and remove the customer from the PE's list of valid customers. Regardless of the criteria used by the tracking device to determine whether a customer is valid, if the customer is not valid, that customer's account record is added to the error data set 68.

After analyzing each customer account record to determine whether the customer was valid 60, the tracking device analyzes each customer record to determine the billing cycle in which each customer account is payable 62. If the billing cycle in which the customer account is payable is the current billing cycle, the customer account record is added to the billed data set 66. If the billing cycle in which the customer account is payable is a future billing cycle, the customer record is added to the unbilled data set 64.

Returning to FIG. 2, after all the customer account records contained in billing data files have been separated into the appropriate tracking data set by the tracking device as described above, the reconciliation device is automatically activated 54 to reconcile the account receivable data submitted by the carrier with the account receivable data processed by the PE.

Figure 4:
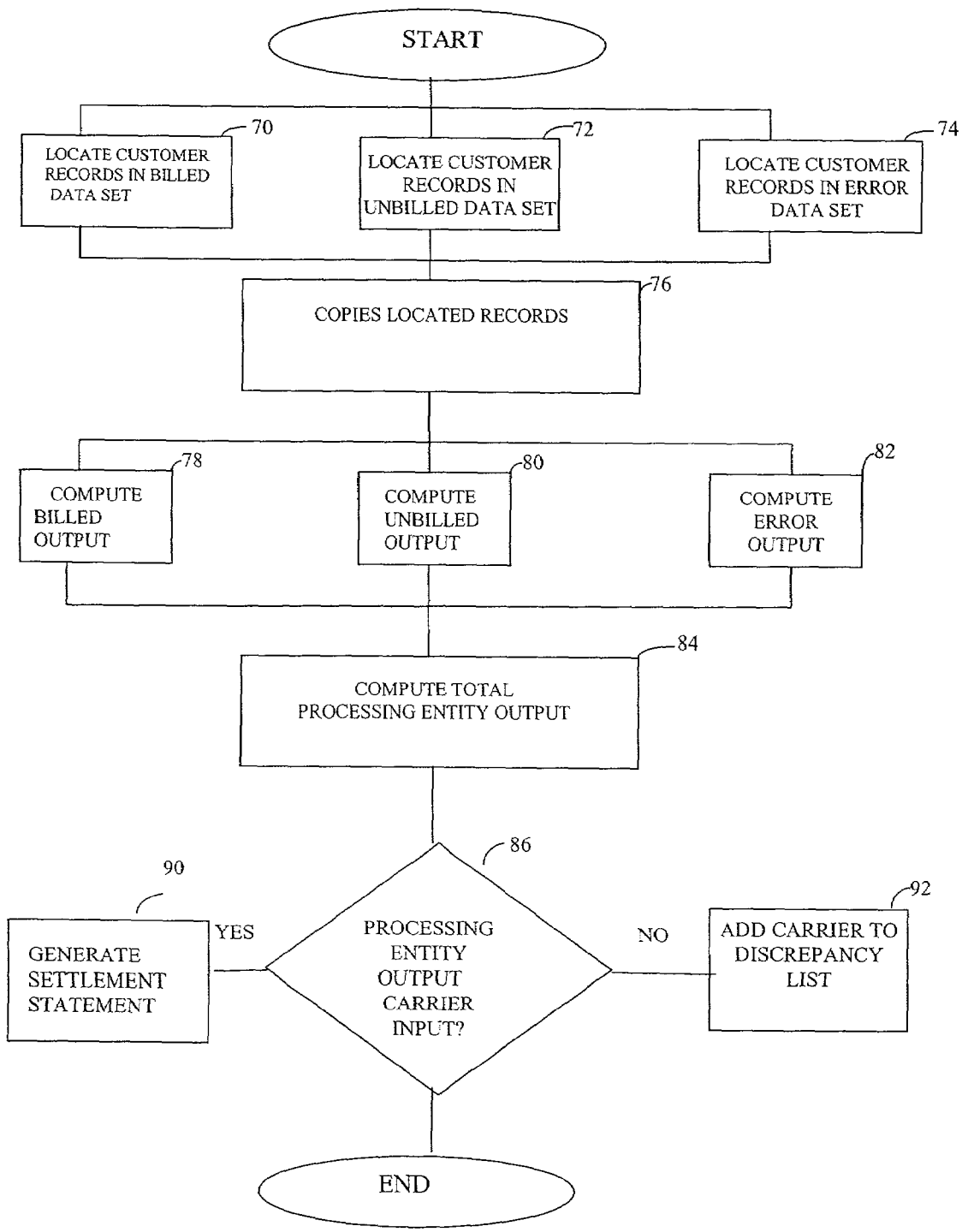
FIG. 4 is a flow diagram illustrating a method of operation for a reconciliation device.

FIG. 4 is a flow chart that describes the operation of the reconciliation device. The reconciliation device uses pre-defined criteria to locate customer account records in each tracking data set for each carrier. In an embodiment of the invention, the pre-defined criteria is the carriers' unique identification code described above. Using the carrier's unique identification code as criterion, the reconciliation device locates 70 each customer account records submitted by a given carrier in each tracking data set. For example, the reconciliation device locates customer account records in the billed data set 70 that contain a carrier identification code matching the carrier identification code criterion. The reconciliation device then copies the amount payable from the customer records 76 located. Once the amount payable is copied 76 from the customer account records in the billed data set, the total amount of accounts receivable located in the billed data set 78. The calculated total amount payable represents the total amount of processed accounts receivable located in the billed data set for the given carrier. The same method is used to compute the total amount of account receivable located in the unbilled data set 80 and the error data set 82.

After the reconciliation device has computed the total processed account receivable located in the billed data set 78, the unbilled data set 80 and the error data set 82, the reconciliation device computes the total amount of accounts receivable processed by the PE 84 for a given carrier. To calculate the total amount of accounts receivable processed by the PE or the PE output 84 for a given carrier, the reconciliation device adds the total accounts receivable it computed in the billed 78, unbilled 80, and error data sets 82.

Once the PE output is calculated 84, the PE output is compared to the total amount of accounts receivable routed to the PE by the carrier 86. If the PE output 84 does not equal the total amount of account receivable transmitted to the PE by the given carrier, a error has occurred and the PF has not properly processed all the account receivable submitted by the carrier. When the reconciliation device detects such an error, it creates a discrepancy report containing the carrier's identification code 92.

In the preferred embodiment of this invention, the discrepancy report include the total amount of accounts receivable located in the billed, unbilled and error data sets for the carrier and the total amount of pre-processed accounts receivable submitted to the PE by the carrier.

If the PE output equals the total amount of pre-processed accounts receivable submitted by the carrier, the PE has processed all the accounts receivable submitted by the carrier. As a result, the reconciliation device creates a settlement report for the carrier 90. In an embodiment of the invention, the settlement report includes the total amount of accounts receivable calculated from each tracking data set for the carrier.

Recall, that in the described embodiment of the invention, the carrier is only paid for accounts receivable that are payable in the current billing cycle. The settlement report, therefore, justifies the amount of payment the carrier receives. The settlement report also informs the carrier of the amount of accounts receivable payable in a future billing cycle and the amount for which they will not be paid due to errors with certain customer account records.

Returning to FIG. 2, both the discrepancy report 56 and the settlement report created for carriers 58 must be routed to the PE's system operator or similarly situated personnel. To route the discrepancy report 56 and settlement report 58, the reconciliation device signals the appropriate network 25 as shown in FIG. 1 to route the discrepancy and settlement reports to a location accessible to PE personnel or other responsive party. In the preferred embodiment, the discrepancy report and the settlement report are routed to a workstation 26 as shown in FIG. 1 to which the system operator has access. When the discrepancy report and settlement statements are routed to a workstation, the system operator may review them on the workstation, print them. or forward them to other responsive parties.

What is claimed is:

1. A method of automatically tracking and balancing account receivable data comprising:
submitting a billing data file to a processing entity, said billing data file comprising customer account records representing accounts receivable for a given carrier;
determining each of said customer account records as one of at least two tracking data sets based on pre-defined criteria;
computing a total amount of accounts receivable for said customer account records located in each tracking data set related to said given carrier;
generating a total amount of processed accounts receivable related to said given carrier by adding the computed total amounts of accounts receivable of the at least two tracking data sets;
comparing a total amount of pre-processed accounts receivable related to said given carrier to the total amount of processed accounts receivable related to said carrier, the total amount of pre-processed accounts receivable being the total amount of the accounts receivable inputted to the processing entity by said carrier;
creating a discrepancy report comprising said carrier if the total amount of pre-processed accounts receivable does not equal the total amount of processed accounts receivables; and
creating a settlement report for said carrier if the total amount of pre-processed accounts receivable equals the total amount of processed accounts receivable.

2. The method of claim 1 further comprising routing said discrepancy report to at least one location accessible to at least one discrepancy source-identifier.

3. The method of claim 1 further comprising routing said settlement report to at least one location accessible to at least one end-user of said settlement report.

4. The method of claim 2 or 3 wherein said at least one location is a workstation connected to the processing entity by a local network.

5. The method of claim 1 wherein said customer account records comprise a unique means to identify the carrier that generated the customer account records.

6. The method of claim 5 wherein said customer account records further comprise a customer account number.

7. The method of claim 5 wherein said customer account records further comprise the amount payable for services rendered by said carrier.

8. The method of claim 5 wherein said customer account records further comprises a billing cycle in which the customer account is payable.

9. The method of claim 8 wherein the billing cycle is the criteria used to determine each of the customer account records as one of said tracking data sets.

10. The method of claim 1 wherein the tracking data sets include a billed data set wherein said billed data set comprises said customer account records with accounts payable in a current billing cycle.

11. The method of claim 1 wherein the tracking data sets include an unbilled data set wherein said unbilled data set comprises said customer account records with accounts payable in a further billing cycle.

12. The method of claim 1 wherein the tracking data sets include an error data set wherein said error data set comprises invalid customer account records.

13. The method of claim 1 wherein the discrepancy report comprises:
the total amount of accounts receivable data submitted to the processing entity relating to said given carrier; and
the total amount of accounts receivable data located in each tracking data set relating to said carrier.

14. The method of claim 1 wherein the settlement report comprises the amount of accounts receivable located in each tracking data set relating said carrier.

15. The method of claim 1 further comprising establishing an agreement between a plurality of said carriers and said processing entity, said carriers agreeing to submit said billing data files to the processing entity and said processing entity agreeing to process said billing data files and remit payment to said carriers.

16. A system for automatically tracking and balancing account receivable data comprising:
a carrier submitting a billing data file to a processing entity, said billing data file comprising customer account records representing accounts receivable for said carrier; and
the processing entity,
determining each of said customer account records as one of at least two tracking data sets based on pre-defined criteria;
computing a total amount of accounts receivable for said customer account records located in each tracking data set related to said carrier;
generating a total amount of processed accounts receivable related to said carrier by adding the computed total amounts of accounts receivable of the at least two tracking data sets;
comparing a total amount of pre-processed accounts receivable related to said carrier to the total amount of processed accounts receivable related to said carrier, the total amount of pre-processed accounts receivable being the total amount of the accounts receivable inputted to the processing entity by said carrier;
creating a discrepancy report comprising said carrier if the total amount of pre-processed accounts receivable does not equal the total amount of processed accounts receivables; and
creating a settlement report for said carrier if the total amount of pre-processed accounts receivable equals the total amount of processed accounts receivable.

17. The system of claim 16 further comprising a notification device routing said discrepancy report to at least one location accessible to at least one discrepancy source-identifier.

18. The system of claim 16 further comprising a notification device routing said settlement report to at least one location accessible to at least one end-user of said settlement report.

19. The system of claim 16 wherein the processing entity includes a data storage device storing said billing data files submitted to the processing entity and storing said tracking data sets.

20. The system of claim 16 wherein the processing entity includes a tracking device determining each of said customer account records as one of said at least two tracking data sets based on said pre-defined criteria.

21. The system of claim 16 wherein the processing entity includes a reconciliation device,
copying said carrier's accounts receivable from said tracking data sets based on said pre-defined criteria;
generating the total amount of processed accounts receivable for said carrier;
comparing the total amount of pre-processed accounts receivable with the total amount of processed accounts receivable for said carrier;
creating a discrepancy report if the total amount of pre-processed accounts receivable does not equal the total amount of processed accounts receivable for said carrier; and
creating a settlement report if the total amount of pre-processed accounts receivable equals the total amount of processed accounts receivable for said carrier.

22. The system of claim 21 wherein said discrepancy report contains a list of carriers whose total amount of pre-processed accounts receivable did not equal the total amount of processed accounts receivable for said carrier.

23. The system of claim 22 wherein said settlement report contains the total accounts receivable computed in each tracking data set for said carrier whose total amount of pre-processed accounts receivable equals the total amount of processed accounts receivable for said carrier.

* * * * *